United States Patent
Order

(10) Patent No.: US 6,609,710 B1
(45) Date of Patent: Aug. 26, 2003

(54) DEVICE FOR AUTOMATIC DETECTION OF THE NUMBER OF SPOTS ON THE TOP SIDE OF A DICE FOR USE ON A PROFESSIONAL BASIS

(76) Inventor: Michail Order, Ostlandstrasse 96, D-50589 Koeln (DE)

( * ) Notice: Subject to any disclaimer, the term of this patent is extended or adjusted under 35 U.S.C. 154(b) by 0 days.

(21) Appl. No.: 09/787,151
(22) PCT Filed: Aug. 25, 1999
(86) PCT No.: PCT/DE99/02666
§ 371 (c)(1), (2), (4) Date: May 30, 2001
(87) PCT Pub. No.: WO00/15313
PCT Pub. Date: Mar. 23, 2000

(30) Foreign Application Priority Data

Sep. 15, 1998 (DE) .......................... 198 42 161

(51) Int. Cl.⁷ .................................................. A63F 9/24
(52) U.S. Cl. .................................... 273/148 R; 463/16
(58) Field of Search .............................. 463/25, 29, 17, 463/42, 16, 20; 273/148 R

(56) References Cited

U.S. PATENT DOCUMENTS

| | | | |
|---|---|---|---|
| 3,810,627 A | * | 5/1974 | Levy |
| 4,339,798 A | * | 7/1982 | Hedges et al. |
| 4,531,187 A | | 7/1985 | Uhland |
| 4,534,562 A | | 8/1985 | Cuff |
| 4,814,589 A | | 3/1989 | Storch |
| 4,858,931 A | * | 8/1989 | McKechnie |
| 4,892,311 A | * | 1/1990 | Zaitsu |
| 5,259,613 A | * | 11/1993 | Marnell, II |
| 5,283,422 A | | 2/1994 | Storch |
| 5,651,548 A | | 7/1997 | French |
| 5,694,045 A | * | 12/1997 | Ikeda et al. |
| 5,707,061 A | * | 1/1998 | Ikeda et al. |
| 5,726,706 A | * | 3/1998 | Walsh |
| 5,762,552 A | * | 6/1998 | Vuong et al. |
| 5,770,533 A | * | 6/1998 | Franchi |
| 5,885,157 A | * | 3/1999 | Harada et al. |
| 6,001,016 A | * | 12/1999 | Walker et al. |

FOREIGN PATENT DOCUMENTS

| | | | |
|---|---|---|---|
| EP | 0 240 203 A2 | | 10/1987 |
| JP | 01-094879 | * | 4/1989 |
| JP | 01-198576 | * | 8/1989 |
| WO | 96 14115 A1 | | 5/1996 |

\* cited by examiner

Primary Examiner—Michael O'Neill
(74) Attorney, Agent, or Firm—Michael J. Striker

(57) ABSTRACT

A gaming apparatus for execution of table games using playing dice and chips is described, which automatically monitors, records and analyzes all the game proceedings. This gaming apparatus includes a device for automatically detecting the state of movement of playing dice and counting pips on upper-facing sides of the playing dice. This device includes at least one camera, connected with a digital image processor, and a computer with an EDP-program for determining a total number of pips on the upper-facing sides of the dice. It cooperates with devices for automatically detecting the location and amount of the bets placed by transponder chips. The computer with the EDP program also analyses the movements of the dice to determine that they have been played in accordance with the rules of the game, e.g. that they have struck the cushion on the gaming table and have rebounded into the playing area on the gaming table.

27 Claims, 2 Drawing Sheets

DEVICE FOR AUTOMATIC DETECTION OF THE NUMBER OF SPOTS ON THE TOP SIDE OF A DICE FOR USE ON A PROFESSIONAL BASIS

TECHNICAL FIELD

The invention relates to a playing arrangement for the professional execution of the game of chance "Craps" and allied games using playing dice and chips, and as a special sub-aspect relates to an arrangement for automatically detecting the number of pips of the upper side of a playing dice.

Craps is a fast and exciting dice game played on a large gaming table in the shape of a rectangle with rounded corners and bounded by a cushion. The playing area of the gaming table is approximately 4 m long and approximately 1 m wide; the height of the cushion amounts to approximately 30 cm. The game "Craps" is played with two playing dice bearing 1 to 6 pips on their sides. The two dice are played in one throw so that the number of pips of one throw, i.e. the sum of the pips of the upwardly facing sides of the playing dice, can amount to between 2 and 12.

The gaming table is covered with a cloth on which the sections and symbols required for the execution of the game are drawn (layout). FIG. 1 illustrates a layout of such a gaming table.

The stakes are placed in the form of chips which are positioned on the sections of the layout. The chips with which the bets are placed and the winnings are paid out consist of disc-shaped plastic counters, the playing value of which is indicated on the one hand by an imprinted value (for example 1, 5, 25, 100, 500, 1000) and on the other hand by a colour (e.g. blue, red, green, yellow) or colour combination (e.g. blue-red, green-yellow-white).

The number of players is basically unlimited but advantageously should not exceed 12. However, only one single player, the thrower or shooter, throws the dice.

The game of "Craps" is supervised and led by a plurality of casino game supervisors, also referred to as dealers or croupiers.

The betting options are extremely diverse and depend in different ways upon the number of pips in each case thrown by the shooter.

A review of the method of play, the betting options and the winning odds for the game "Craps" will be given in the following making reference to FIG. 1.

The shooter and co-players firstly place their stakes for a "pass line" bet or a "don't pass" bet and position their chips on the "pass line" section or the "don't pass bar" section.

Then the shooter selects two dice from a set of five dice presented to him by the dealer and throws these in one shot, using the same hand, from one end of the gaming table along the full length thereof towards the broad side of the other end of the table; the dice strike against this end of the table, rebound from the cushion into the playing area, and come to rest. In order that the dice rebound in a motion which cannot be controlled by the shooter, the cushion is preferably covered with knobs. If one of the dice should not reach the cushion, remain in contact with the cushion or, after impact, leave the playing area across the cushion, the throw is invalid and must be repeated.

If the shooter's first throw, the so-called "come out roll", produces a 7 or 11, the pass-line bets have immediately won and are paid out by the bank with odds of 1:1, whereas the "don't pass" bets have automatically lost and are collected in by the bank. It is on account of these immediately decisive values 7 and 11 that the game "Craps" is also known as "Seven Eleven".

If on the other hand the "come out roll" produces a 2 or 3, the "don't pass" bets win and the "pass-line" bets lose. If the "come out roll" produces a 12, the pass-line bets lose and the don't pass bets are subject to a "stand-off" (neither win nor lose).

In the above described cases the same shooter continues to throw the dice until he throws a 4, 5, 6, 8, 9 or 10 and thus sets the "point" which is critical for the following course of play. The "point" can of course also be obtained with the "come out roll".

After the "come out roll", as indeed after every further throw, previous players and new players can place stakes again, and indeed for all the diverse betting options which will be referred to later in the description.

When the point is set, the shooter throws the dice again until he has either thrown 7 pips (the shooter "sevens out") or has obtained the point again. If the point is obtained before the 7, the "pass-line" bets win and the "don't pass" bets lose, and if the 7 is obtained before the point, the win and lose situation is the reverse.

If the shooter is out, the game supervisor appoints the next shooter and the game continues as described with reference to the first shooter.

As soon as the "point" is set, in addition to the "pass-line" and "don't pass" bets, "Craps" permits a wide variety of further bets, thus the bets "come", "don't come", "odds", "buy and lay", "place bets to win", "hardways" "field", "any seven", "any craps, "two craps or aces", "twelve craps", "three craps or ace-deuce", "eleven", "horn high bets" and more.

These bets are in part dependent upon the point and in part independent thereof. Hardways bets can be placed only by the dealer. Certain bets can be increased, reduced, withdrawn or declared "off" in the course of the game. Some bets apply only to the respective next throw ("one roll bets"), thus for example bets on the numbers 4, 5, 6, 8, 9, 10. In some cases a 5% payment ("vigorish") must be made to the bank. The winning odds are inversely proportional to the statistical winning probabilities and range between 1:2 and 30:1 comprising the following odds: 1:2, 2:3, 5:6, 1:1, 7:6, 6:5, 7:5, 3:2, 9:5, 2:1, 4:1, 7:1, 9:1, 15:1, 30:1.

It is unnecessary to master the rules of the game in order to understand the invention. It should merely be noted that the game Craps is highly diverse and complicated and makes very high demands on the up to five dealers per gaming table in terms of attention, supervision of players and their bets, and in terms of the calculation skills of the dealer in determining the players' winnings, it being necessary to balance the bank after each throw.

The invention is based on the following problem area.

Casinos are lacking in technical monitoring facilities for dice games played as table games (live games). This applies in particular to the highly diverse game "Craps", but also to other dice games. Even with a high outlay in personnel and optical monitoring systems, considerable security gaps exist.

In view of the speed of play and diversity of the game Craps, a particular insecurity factor relates to maintaining the continuously high level of attention and concentration which is required of the dealers for monitoring, and complying with, the game rules and ensuring that the winnings are correctly determined and paid out to the players.

Therefore it is necessary to find a solution whereby the game procedures can be monitored and recorded as comprehensively and reliably as possible and whereby the dealer can be assisted in correctly determining the winning odds and winnings resulting from the placed stake. A desirable monitoring, recording and win-determining system of this kind must be capable of detecting errors and incorrect decisions on the part of dealers and assisting in the correction thereof. In the event of differences of opinion between players and dealer or between the casino operator and the dealers, it is to be possible for every game which has taken place to be reliably reconstructed in full in some way, at least in terms of placed stake, selected bet and resultant winnings amount.

The advantages of the desired solution are obvious. Incorrect influencing of the course of the game by dealers, in particular to the advantage of players, is prevented. Dealers can justify themselves in the event of disputes on the part of players. The winnings payouts are calculated for the dealer. The settlement between dealer and bank is conducted correctly and simply. It is also desirable to obtain verifiable information on the professional qualities of the dealers, and to gain knowledge about the individual playing strategies of particular players. The possibility of being able to create a player profile based on objective statistical data is also of interest to the casino management.

To implement the described concept for the solution of the described problem area, the invention is based on the objective of making available an automatic monitoring, control and recording system which, in particular in the case of the game Craps, monitors, records and stores all the playing moves, from the throw of the dice to the determination and calculation of the players' winnings, and which enables the acquired data to be analyzed and made available under the various play-related and casino-management aspects.

This requires the following amongst other things:

The course of the game is to be capable of being automatically detected, as far as possible in respect of all its phases and, by means of a computer and an electronic data processing program (EDP program), recorded, stored and reproduced on display devices; the display devices are intended for the dealers, optionally also for the casino administration, and in particular also for the players.

For this purpose a device is to be provided for automatically detecting the dice movements and the number of pips thrown on the dice.

The gaming table is to comprise devices for automatically detecting the occupation by chips of the sections for the stakes. The playing sections must be able to be assigned to the different betting options.

The value of the chips used for each bet is in each case to be detected, processed and stored.

The EDP program is in particular to detect the value of the stakes, recognise and add the number of pips showing on the two dice, recognise the selected bets including the placed stakes, and after each throw determine in accordance with the game rules which of the bets has won or lost or has remained undecided. Additionally the EDP program is to calculate the winnings and assign these to the betting positions by an optical display, for example on one or more screens. The EDP program is also to detect and indicate when the shooter must seven out.

This complex objective is achieve by a gaming apparatus comprising a gaming table with a game cloth and sections, lines, areas or zones, predefined on the game cloth, for placement of chips for table games, especially craps;

playing dice for these table games;

means for automatically counting pips on upper-facing sides of the playing dice including at least one TV camera or CCD image converter and a digital image processor (DIP) connected with the it for processing output signals from it;

means for detecting, analysing, displaying and storing sequences and data of game events, which include detectors arranged under the game cloth of the gaming table for detecting which of the sections, lines, areas or zones the chips occupy, means for automatically detecting locations at which stakes in the form of the chips are placed and thus the type of bets placed, means for detecting values of the stakes detected by the means for automatically detecting and a computer with an EDP program, created in accordance with game rules, for analysing image data from the digital image processor in order to determine a movement state of the playing dice on a playing surface and in order to determine a total number of the pips on the upper-facing sides of the playing dice when the playing dice come to rest on the playing area, and for analysing signals from the means for detecting the locations and the value of the stakes placed and optionally from other signal generators; and at least one display device for displaying analysed game course data relating to game play supplied to the at least one display device from the computer.

In a particularly preferred embodiment of this gaming apparatus for playing craps the computer with the EDP program include means for analysing the image data from the digital image processor to establish whether or not the playing dice have been simultaneously thrown according to the rules of the game, whether or not both dies have struck the cushion at the other end of the gaming table providing the playing area, one of the dies has left the playing area or the playing dice have both come to rest on the playing area.

In preferred embodiments of the gaming apparatus the detectors, arranged under the game cloth, for determining occupation or non-occupation of the sections, lines, areas or the zones provided for placement of the chips are light-sensitive sensors for recording light passing through the game cloth.

Preferably respective chips are provided with corresponding integrated transponders and a radio frequency identification (RFID) device for detecting the location and the value of the stakes Is placed in the form of the chips. The radio frequency identification device comprises a transmitting and receiving station and the integrated transponders cooperate with the transmitting and receiving station, so that, in response to high-frequency data signals from the transmitting and receiving station, the transponders send back data characteristic of a play value of the chips by radio transmission to the transmitting and receiving station, which includes means for analysing the data characteristic of the play value. In various preferred embodiments the at least one camera of the device that counts pips is a TV camera or a CCD image converter. The means for automatically counting pips also advantageously includes a spectral filter, placed in front of the at least one camera, for absorbing coloured light reflected by the playing dice, and a flash lamp, controllable by the EDP program, arranged in the vicinity of each camera.

Preferred embodiments of the gaming apparatus include a cushion, bounding the playing surface, and a plurality of impact sensors arranged in the cushion for detecting an impact of the playing dice against the cushion. Also the computer with the EDP program advantageously comprises means for activation of the at least one camera for discontinuous camera recording action in response to a signal from at least one impact sensor generated in response to an impact of the playing dice on the cushion.

Prior Art and Application Thereof to the Invention

The prior art offers means of equipping the gaming table with devices for automatically detecting the playing sections occupied by chips and also for detecting the stakes placed in the form of one chip or a pile of chips. Thus means of implementing both aspects (automatic detection of the occupation of the gaming table by chips; automatic detection of the individual stakes) are given in WO 96/14115 A1 and in the corresponding EP 0 790 848 B1 which relate to a "game system for the professional execution of table games using playing cards and chips, in particular the game 'Black Jack'".

In the present invention, to automatically detect whether chips or piles of chips have been deposited or not on a surface or zone or line defined by the layout of the playing area of the Craps table, it is thus possible to use detectors which are arranged under the game cloth and which respond to changed pressure conditions or changed light conditions upon the setting down or removal of the chips. Preferably, light-sensitive sensors, in particular photo-diodes sensitive to IR-light, are used under such a game cloth which is partially light-transparent. The darkening of the photo-diodes caused by the deposited chip then triggers a signal which is fed to an automatically recording computer unit. The active yes-no circuit only indicates whether a chip is placed on the gaming table or not; accordingly these detectors are known as occupation detectors.

To also detect and automatically record the playing value of the deposited chip or pile of chips, as disclosed in WO 96/14115 A1 it is possible to use scanners which react to strip patterns or coloured rings at the edges of the chips. However it is particularly advantageous and convenient to use so-called smart chips as playing chips. These are chips with an embedded transponder. Such transponders are battery-free electronic components which serve as responders within a radio frequency identification (RFID) system, such that they react to the radio signals of a transmitting-receiving device arranged for example under the gaming table. The radio signals emitted via an antenna of the transponder incorporated in the chip are i.a. specific to the playing value of the chip. Thus, in a manner known per se, the playing value of not only one single chip, but also of a pile of such transponder chips can be detected. Moreover the RFID system also permits the detection of the measurement location, i.e. the position of the chip or pile of chips on the playing area or layout. More detailed information on the construction, operation and use of such transponder chips is given not only in WO 96/14115 A1 but also in Patents U.S. Pat. No. 4,814,589, U.S. Pat. No. 5,283 422 and U.S. Pat. No. 5,651,548, the last of which also proposes the use thereof for the game Craps (U.S. Pat. No. 5,651,548, FIG. 6).

If transponder chips are used and if the Craps gaming table comprises radio technology equipment which, as mentioned in the foregoing, enables not only the playing value of the stake but also the playing section in which it has been placed to be defined, it is possible to dispense entirely or partially with the use of occupation sensors for example in the form of IR photo-diodes.

Moreover, in accordance with the prior art according to WO 96/14115 A1, it is basically known for the data on the events of the game obtained by means of technical devices to be supplied to a computer unit, and for the computer to analyze the supplied data in accordance with the game rules, retrievably store said data and if required display said data on a monitor. This too is utilized by the invention.

For the game Craps, which is played on a table with a length of several metres, it is advisable for the data which are to be continuously displayed or made known to the players to be displayed in distributed fashion on a plurality of monitors. If the monitors are assigned to specific portions of the gaming table, it is possible to display only the game moves and game results which have occurred in this assigned portion, thus for example the location at which the stake is placed, and thus optionally to simultaneously display the type of bet, as well as the amount of the stake and finally the winnings or losses resulting from the shooter's throw.

DETAILED DESCRIPTION OF THE INVENTION

Figure 1:
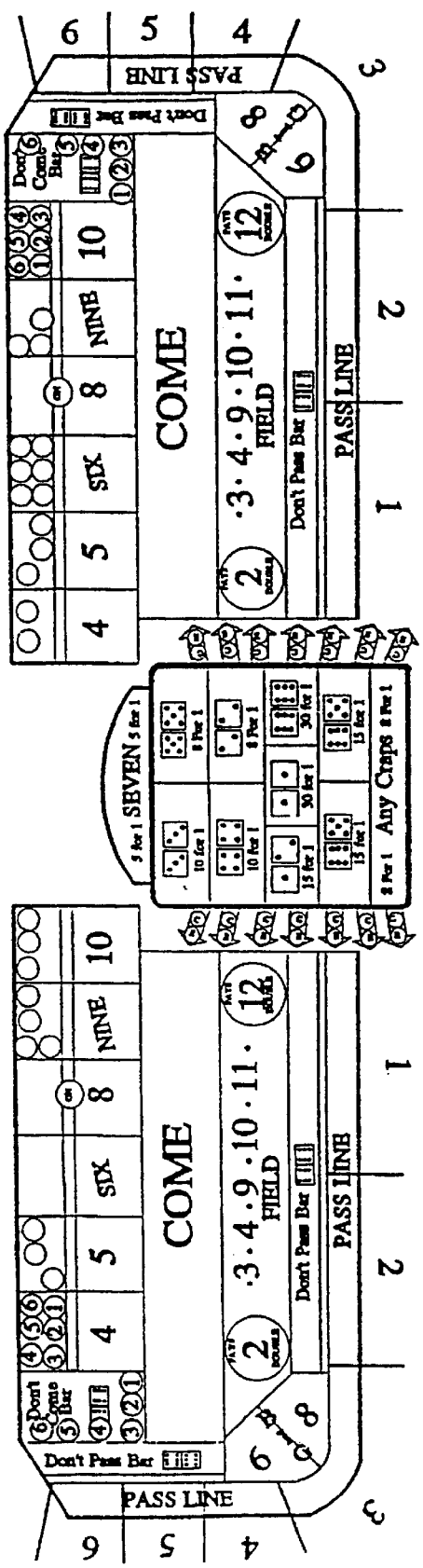
FIG. 1 illustrates the layout of a Craps gaming table (without the gaming table cushion which surrounds the layout at a distance therefrom; the stakes placed by several players for a "don't come" bet in the form of chips are shown by the small circles; the lines dividing the PASS LINE into two times six sections are not actually present; the sections thus formed correspond to typical player positions.

To automatically detect whether and where on the gaming table for the dice game, a stake has been placed in the form of one chip or a pile of chips, it is possible to use the same two technical principles employed in the case of the gaming table for the card game "Black Jack" known from WO 96/14115 A1.

The first principle is based on providing occupation detectors under the game cloth (layout), which, in a yes-no circuit, indicate whether a chip or pile of chips has been deposited or not at a defined location on the playing area. Light-sensitive sensors (IR photo-diodes) are preferably also used as such occupation detectors for the game Craps. As these occupation detectors can now be assigned to defined locations or sections or lines on the layout of the playing area, an activated occupation detector can simultaneously also define the type of bet (e.g. "don't pass" or "don't come" or a number bet).

The other principle is based on the function of the transmitting-receiving devices of the radio frequency identification (RFID) system arranged under the layout for the transponder chips. As the transmitting-receiving devices of the RFID system can be assigned to defined locations or sections or lines on the layout of the playing surface, here again an activated transmitting-receiving device can define the type of bet.

In order then to determine the value of the stake, if occupation detectors (photo-diodes) were used, scanners known from WO 96/14115 A1 could be employed to detect the playing value of the chips—or preferably transponder chips are used. The particular conditions of the practical use of the gaming table or technical developments will allow one skilled in the art to decide whether he or she will use the Craps gaming table equipped only with occupation detectors (photo-diodes) or only with the RFID system, or whether he will use both technologies or principles.

The objective of the invention, namely that games using dice and chips on a gaming table, in particular the highly diverse game Craps, be automatically monitored and analyzed as far possible In respect of all playing moves, and that the game results thereof be presented, can be implemented in detail—as stated in the foregoing—using technologies and principles as disclosed in particular in WO 96/14115 A1 (and EP 0 790 848 B1). These include the detection of the stakes, the detection of the type of bets placed, the use and arrangement of a computer for analyzing the supplied measurement data in accordance with the game rules, and the display of required data and results on display devices or monitors.

Thus the entirely new partial objective of the invention, and the main objective of the invention consist of automatically detecting in error-free manner the movement sequences of the playing dice in normal play and the number of pips showing on the dice after they have been thrown, whereupon these are analysed in accordance with the game rules.

For this purpose the system for the game Craps must be able to detect:

that the two dice have been thrown simultaneously in accordance with the game rules along the longitudinal side of the gaming table;

that the two playing dice strike the cushion at the other end of the table;

that the two playing dice have rebounded into the playing area or whether one of the dice has left the playing area (has bounced over the cushion);

that the rebounding dice have come to rest;

and, as a main requirement, the number of pips showing on each dice, the sum of which forms the number of pips of the throw.

Figure 2:
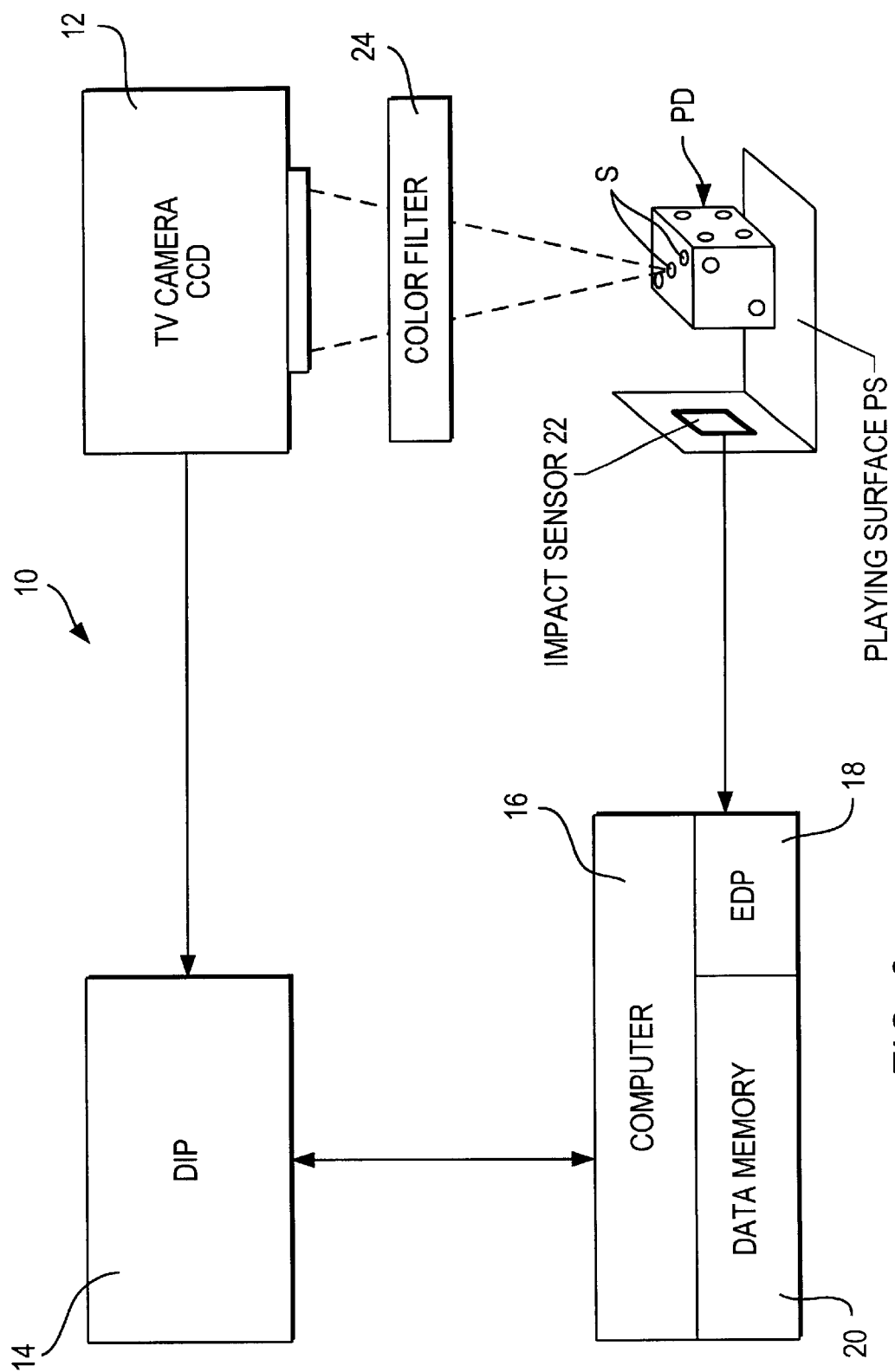
FIG. 2 illustrates an arrangement according to the invention for automatically detecting the number of pips on the upper side of a playing dice (in a purely systematic illustration).

This main objective of the invention is achieved, as schematically illustrated by way of example in FIG. 2, by The apparatus 10 for automatically detecting the number of pips S on the upper side of a playing dice PD at least comprising: at least one optical device 12 for forming an image of at least a part of the playing surface PS of the gaming table, a digital image processor (DIP) 14 and a computer 16 whose EDP program 18 is capable of determining the state of movement of the thrown dice and distinguishing the optical signals emanating from the pips or spots S of the upwardly facing side of the dice from the other optical signals of the gaming table, where such other signals are recorded by the optical device. The computer 16 has an associated data memory 20. The optical device 12—in the following also referred to simply as camera—can comprise a TV camera or a specially designed CCD image converter (CCD video signal input system), which sends its output signals to a digital image processor (DIP) 14. The digital image processor (DIP) processes the received video signals in respect of two-dimensional conversion and resolution, spectral resolution and other parameters, such that the primary detected image (TV-camera; CCD image converter) is digitally converted such that it can be detected and processed by an electronic data processing (EDP) program 18 downstream of the image processor. A simpler image is formed by means of the EDP processing. Additionally, digital cameras are now available, providing a digital image comprising in the region of two million pixels, and these are highly suitable for the purpose of the invention.

The main function of the EDP program is to detect the number of pips borne by each of the dice and/or both dice together and optionally to previously determine that the dice have been thrown, and to determine when the dice have come to rest.

In the following the apparatus defined in the invention for detecting and recognising the movement states and rest state of the dice on the playing area will be explained in detail.

The arrangement can be designed for a continuously operating or discontinuously operating observation process.

For the continuous process the camera (TV camera; CCD image converter; digital camera) must make a continuous recording, the EDP program being designed to correspond to a movement sensor such that it firstly interprets a fast and long trajectory of an object on the gaming table as the throw of the shooter. An obvious disadvantage of the continuous process is that the camera continuously generates a high noise level and that interference occurs due to the movement of the chips and the hands of the players and dealers. As a result, misinterpretations of the true state of movement of the dice could occur more frequently via the DIP unit and EDP program. That is to say, the system could display throws of the shooter, which did not take place. As described later in the description, such misinterpretations can be reduced by equipping the dice with specific physical features, which permit a more selective detection of the trajectory of the dice.

A discontinuous process, in which the camera and at the same time the entire measurement system are not activated until the dice have actually been thrown in accordance with the game rules, is considerably more advantageous. This is achieved by the use of movement sensors 22, which switch on the camera. In accordance with the invention, such a sensor consists of a vibration—or pressure sensor in the cushion against which the thrown dice must strike. A plurality of such impact sensors 22 must be provided corresponding to the possible impact surface for the dice. When a knobbed coating is provided for the uncontrolled rebounding of the dice against the cushion, these sensors are advantageously already incorporated in the material for the knobbed coating.

FIG. 2 shows a symbolic representation of such an impact sensor 22.

Only when both Craps dice strike the cushion and each thereof actuates a sensor 22, is the camera activated. If only one dice impact is recorded, this will normally mean that, contrary to the game rules, the second dice either has come to rest en route or has left the playing area as a result of bouncing off an object on the playing area (chip; pile of chips) or bouncing off the lateral cushion.

Because the table used in the game Craps has a length of one meter, it will undoubtedly be insufficient to use only one camera. Rather, a plurality of cameras will be required, distributed over the table. Depending upon the camera type, camera quality, and other parameters, for example the technical features of the dice surfaces and/or the light conditions, one skilled in the art will be capable of determining the number and arrangement geometry of the cameras, relative to the dimensions of the gaming table, necessary for efficient functioning.

If a plurality of cameras are used, it is correspondingly necessary to provide a plurality of DIP units to form TV/CCD DIP systems, while the EDP program must be set up such that it correlates and analyzes all the synchronously obtained images.

Irrespective of whether the camera operates continuously or is switched on by the dice impact, the dice PD will move back from the cushion into the playing area where they will come to rest, while the cameras must record the images of the two stationary dice in addition to a large number of pictorial data, and the DIP and EDP system components must recognise the dice as such and in particular must determine and process the number of pips thereof. The image of the gaming table, and/or of that portion of the playing surface PS for which the relevant camera is provided and set up, is/are recorded by the cameras continuously or at any rate for a specific time interval following the dice impact. Here the image data sent from the DIP 14 to the computer 16 are continuously analyzed by means of the EDP program 18. As soon as two and more consecutive images are identical, this means that the dice are at a standstill. The EDP program 18 is constructed such that it is possible to detect that both Craps dice have come to a standstill. Most expediently, this is affected using the same identification process with which the number of pips S on the upper side of the dice PD are determined as the dice come to a standstill. This identification process consists of distinguishing the optical signals emanating from the pips of the dice from the other optical signals of the images recorded by the cameras. Further details will be given later in the description.

As stated, the EDP program enables the stationary state of the dice to be determined. When a plurality of cameras are provided, it can occur that both dice are detected by the same camera or that the dice are detected by different cameras. Moreover, the situation can occur that one and the same dice is detected by two cameras, i.e. when it is situated in the overlap area between two adjacent cameras. Moreover it can occur that only one single dice is detected. The EDP program 18 is prepared for all these situations. If, in the game Craps, only one dice is detected, this is defined by the EDP program as a mis-throw by the shooter and the throw is declared invalid.

If two cameras detect the same dice PD, a discriminator circuit must eliminate one of the two image recordings, preferably the one with the weaker signal.

The dice PD are detected by the measuring apparatus 10 comprising camera 12, image processor 14 and computer 16 on the basis of the physical features of the pips (white spots) S of the dice; furthermore, the recognition of the dice as an object can be assisted by special optical features of the dice body. It is important that the pips S of the dice PD form a brightness contrast with their immediate or general surroundings.

Standard playing dice PD and colour filters 24 can be used for this purpose. Standard playing dice are composed of a semi-transparent plastics material, which is coloured, preferably red. If a spectral colour filter 24—see also FIG. 2 which absorbs the colour of the dice PD is positioned before the camera observing the image of the table, the dice body is depicted as a black structure with white spots, representing the pips of the dice, distributed thereon. If a dice is red, blue-green spectral glass filters 24 are thus used.

When the dice PD is in projectile motion, this technique generates so-to-speak a black motion band with light tracks (from the pips of the moving dice) and provides an outstanding criterion for reducing the above-mentioned misinterpretations.

Another method whereby the pips can be caused to stand out from the dice surfaces and also from the other white dots and spots in the environment, consists in changing the luminosity of the pips or their light reflective properties. Corresponding examples will be given. If UV-light radiators are arranged above the gaming table, UV-light-active components can be added to the material for the dice pips to make the pips particularly shiny. The optical features of the dice pips can also be changed in characteristic fashion if the pips contain small (approx. 1 mm) refractive prisms or if holograms are used for the pips instead of white coloured spots. It would also be possible to use interference mirrors on the dice pips; further details will be given in the following.

The described measures do not merely serve to render the dice particularly recognisable as the object to be identified by the camera; rather, the above described optical effects and special formations of the dice pips serve to permit a more reliable detection of the number of pips on the upper, horizontal side of the dice and to enable the image of the pips (the configuration of the 1 to 6 pips of the dice sides) on the upper side of the dice to be distinguished from the "pip images" of the vertical sides of the dice which are also detected by the camera.

The detection of the actual number of pips on the upper side of the dice via mathematical algorithms does in fact pose a specific problem for the EDP program 18 and for the construction thereof. Such algorithms must function on the basis of the specified configuration of the white spots or pips and the coordinates thereof; the mutual spatial configuration of the white spots and spot coordinates can be determined more clearly by including the position of the dice edges. In this case the dice edges and dice corners can be defined by the digital image processor (DIP) 14 on the basis of the differences in colour or brightness between the table surface and the dice contours as a result of the spectral processing of the image.

Particular possibilities of eliminating interference signals emanating from the pips of the vertical surfaces of the dice observed by the camera will be described in the following.

One structural possibility consists in arranging the white coloured spots S of the pips on the base of a small recess and filling the recess with a transparent material. In this case the white spots S can be observed more or less only from above and no longer from a specific tangential angle of view.

Another structural possibility is based on the use of interference mirrors, which operate in accordance with the following principles: The reflection coefficient is dependent upon the angle of incidence. With a normal angle of incidence it is small whereas in the case of tangential light incidence it is approximately 100%. If small mirrors are now arranged on the white spots, these reflect back the light tangentially from the surface in accordance with geometric light incidence rules. With a normal angle of incidence onto the surface, the light is mainly reflected back by the mirror but dispersed by the white spots. Thus if a light source is arranged above the gaming table and the light falls normally onto the surface, only the light from the surface of the dice is reflected back and reaches the camera, while the light from the other sides of the dice is absorbed by the table surface.

Similarly, it is also advantageous to equip the dice PD with corner reflectors, which reflect back the light to the light source. This technique is very useful for withholding other white objects from the image, such as white parts of chips and the like, because the white spots of the dice surface are very much brighter than other white objects on the table surface. In this case the light source should be arranged as close as possible to the camera.

The image analysis, i.e. the analysis of the images of the white dice spots (pips) detected by the camera(s) must now take place in the computer, such that the images containing the interference spots are eliminated, for example by a discriminator circuit, so that only the desired images of the upwardly facing dice pips distinguished by their brightness value are detected and analyzed in accordance with the game rules. One skilled in the art will be in possession of the required software knowledge or will be able to avail himself or herself thereof.

A problem which arises in the case of a larger interval, in particular an oblique interval, between the camera and the dice to be measured could reside in the resolution of the camera. In particular in the case of the 6-pip side of the dice, the white spots, i.e. the images of the 6 white spots, could merge into one another. This could be easily remedied by the use of digital cameras, the resolution of which is ever increasing and which provide in the region of 2 million pixels and more. On the other hand it is possible to use zoom cameras, which, under the control of the EDP program, enlarge the basic detected dice image.

A larger number of cameras above the playing area could also enable the dice object to be observed as vertically as possible, eliminating "noisy" white spots on the vertical dice surfaces.

Finally, the resolution of the dice image of 5 or 6 pips could be increased by forming the white spots of the dice pips as two white values or brightness values. A base area of for example light-grey colour bearing a really white spot would not be experienced by the human eye as non-uniform in colour, but could readily be resolved in terms of colour by the camera. If such "really white spots" are thus arranged centrally in the base area of the pips, these spots can still be resolved by the camera if the images of the wider pips merge with one another.

Particular mention should be made of the technique of taking a camera shot under flash light in the event of an unclearly identified dice—and pip image. If the routine camera shot is unclearly defined, the EDP program 18 causes a camera 12 arranged nearest to the dice in the vertical direction and a flash lamp arranged as close as possible to the camera 12 to operate in synchronism. The now recorded image of the dice, or possibly of both of the thrown dice, then provides a reproduction of the upper dice surface, which is not, or only slightly, affected by interference spots.

At the latest at this time, the measuring arrangement switches off, unless it had already been switched off and had been re-activated only for this control flash-light photograph.

It would also be possible for every measurement following the standstill of the dice to routinely conclude with such a flash-light photograph.

If, in spite of a flash-light photograph, the system is still ambiguous about the number of pips on the dice, this would indicate that the dice is not lying flat but has come to rest obliquely on an object or obliquely between playing area and cushion so that the throw is invalid. In such a case the EDP program 18 will declare the shooter's throw invalid so that the throw must be repeated.

The following details relate to the overall game system according to the invention.

The data detected by each functional technical unit—including the measuring arrangement for the number of pips on the dice, the chip detection devices of the gaming table, and the stakes detector (scanner; RFID system)—are to be sent directly or indirectly as output signals to a central computer. This forwarding of the output signals can take place either by cable link or wirelessly, for example by radio data transmission.

The function of the central computer is to analyze all the recorded data which it is sent in accordance with the EDP program and the game rules, display this data to the dealer and players if desired on one or more screens or the like, and generally store it for later retrieval.

The acquired game data can also be utilized for an acoustic or optical display, if for example the dealer has made a game error or if the monitoring system is unable to clearly define the position (flat or oblique) and number of pips of the dice, in order then to alert the dealer to his supervisory and decision-making function. The stored game data can serve for the evaluation of dealers, players, individual game days or times of day, for statistical purposes and, particularly obviously, for settlements between dealer and casino cashier.

To conclude the explanation of the invention, it should be noted that the apparatus defined in the invention for automatically detecting the number of pips need not remain limited to the number of pips of playing dice, but in principle is also suitable for determining the number of pips of game objects other than dice, for example for monitoring and recording the juxtapositioning of dominoes and game pieces for the Chinese game Ma-Jongg.

What is claimed is:

1. An apparatus for automatically counting pips on an upper-facing side or sides of at least one playing die, said apparatus comprising
    at least one camera consisting of at least one TV camera or at least one CCD image converter,
    a digital image processor (DIP) connected with said at least one camera for processing output signals from said at least one camera, and
    a computer receiving image data from said digital image processor, said computer having an EDP program comprising means for determining a movement state of the at least one playing die over a playing area and means for determining a total number of said pips on the upper-facing side or sides of the at least one playing die when said at least one playing die comes to rest on the playing area.

2. The apparatus defined in claim 1, wherein said at least one playing die consists of playing dice and said means for determining a movement state of the playing dice over said playing area comprises means for determining whether or not said playing dice have been thrown simultaneously along a longitudinal side of a gaming table providing the playing area, whether or not one die of said playing dice has left the playing area and means for determining whether or not said playing dice have come to rest on the playing area.

3. The apparatus defined in claim 1, further comprising a spectral filter, placed in front of said at least one camera, for absorbing coloured light reflected by the at least one playing die.

4. The apparatus as defined in claim 2, wherein said gaming table has a cushion, bounding the playing area, and a plurality of impact sensors arranged in the cushion for detecting an impact of the playing dice against the cushion.

5. The apparatus as defined in claim 4, wherein said EDP program comprises means for activation of said at least one camera for discontinuous camera recording action in response to an impact signal from at least one of the impact sensors and said impact signal is generated in response to said impact of said playing dice on said cushion.

6. The apparatus as defined in claim 1, wherein said at least one camera consists of a plurality of cameras arranged above the playing area for observing respective sections or portions of the playing area.

7. The apparatus as defined in claim 1, further comprising a flash lamp, controllable by the EDP program, arranged in the vicinity of each of said at least one camera.

8. The apparatus as defined in claim 1, further comprising means for detecting white spots acting as said pips arranged on respective bases of recesses and wherein said recesses are provided in corresponding sides of the at least one playing die, in order to prevent or reduce detectability from specific tangential viewing angles.

9. The apparatus as defined in claim 1, further comprising means for detecting respective refractive prisms on said at least one die and wherein said respective refractive prisms act as said pips or comprise said pips.

10. The apparatus as defined in claim 1, further comprising means for detecting a hologram on said at least one die and wherein said hologram acts as said pips.

11. The apparatus as defined in claim 1, further comprising an interference mirror covering said pips of the at least one playing die.

12. The apparatus as defined in claim 1, further comprising means for detecting at least one of corners and edges of said at least one playing die and wherein said at least one playing die is equipped with reflectors at least one of said corners and said edges to facilitate said detecting.

13. A gaming apparatus for professional execution of table games using playing dice and chips, said gaming apparatus comprising:

a gaming table with a game cloth and sections, lines, areas or zones, predefined on the game cloth, for placement of said chips for said table games playing dice for said table games;

means for automatically counting pips on upper-facing sides of said playing dice including at least one camera and a digital image processor (DIP) connected with said at least one camera for processing output signals from said at least one camera, said at least one camera consisting of at least one TV camera or at least one CCD image converter;

means for detecting, analysing, displaying and storing sequences and data of game events; wherein said means for detecting analysing, displaying and storing includes
detectors arranged under the game cloth of the gaming table for detecting which of said sections, said lines, said areas or said zones said chips occupy,
means for automatically detecting locations at which stakes in the form of the chips are placed and thus the type of bets placed,
means for detecting values of the stakes detected by the means for automatically detecting, and
a computer with an EDP program, created in accordance with game rules, comprising means for analysing image data from the digital image processor in order to determine a movement state of said playing dice on a playing area and in order to determine a total number of the pips on the upper-facing sides of the playing dice when the playing dice come to rest on the playing area, means for analysing signals from the means for detecting the locations and the value of the stakes placed and optionally means for analysing signals from other signal generators; and at least one display device for displaying analysed game course data relating to game play supplied to said at least one display device from said computer.

14. The gaming apparatus as defined in claim 13, wherein said at least one display device has a display screen.

15. The gaming apparatus as defined in claim 13, wherein said detectors, arranged under the game cloth, for determining occupation or non-occupation of the sections, lines, areas or the zones provided for placement of the chips are light-sensitive sensors for recording light passing through the game cloth.

16. The gaming apparatus as defined in claim 13, further comprising respective chips with corresponding integrated transponders and a radio frequency identification (RFID) device for detecting the location and the value of the stakes placed in the form of the chips, and wherein said radio frequency identification device comprises a transmitting and receiving station and said integrated transponders cooperate with said transmitting and receiving station, so that, in response to high-frequency data signals from the transmitting and receiving station, the transponders send back data characteristic of a play value of the chips by radio transmission to the transmitting and receiving station, and wherein the transmitting and receiving station includes means for analysing said data characteristic of said play value.

17. The gaming apparatus as defined in claim 13, wherein said table games include craps.

18. The gaming apparatus as defined in claim 13, wherein said means for analysing image data from the digital image processor in order to determine said movement state of said playing dice comprises means for determining whether or not said playing dice have been thrown simultaneously along a longitudinal side of a gaming table providing the playing area, whether or not one die of said playing dice has left the playing area and means for determining whether or not said playing dice have come to rest on the playing area.

19. The gaming apparatus defined in claim 13, wherein said means for automatically counting said pips on said upper-facing sides of said playing dice includes a spectral filter, placed in front of said at least one camera, for absorbing coloured light reflected by the playing dice.

20. The gaming apparatus as defined in claim 13, further comprising a cushion, bounding the playing area, and a plurality of impact sensors arranged in the cushion for detecting an impact of the playing dice against the cushion.

21. The gaming apparatus as defined in claim 13, wherein said EDP program comprises means for activation of said at least one camera for discontinuous camera recording action in response to an impact signal from at least one of the impact sensors and said impact signal is generated in response to said impact of said playing dice on said cushion.

22. The gaming apparatus as defined in claim 13, wherein said means for automatically counting said pips on said upper-facing sides of said playing dice comprises a flash lamp, controllable by the EDP program, arranged in the vicinity of said at least one camera.

23. The gaming apparatus as defined in claim 13, wherein said playing dice each have white spots arranged on respective bases of recesses acting as said pips and said recesses are provided in corresponding sides of each of said playing dice, in order to prevent or reduce detectability from specific tangential viewing angles.

24. The gaming apparatus as defined in claim 13, wherein said playing dice each have respective refractive prisms thereon acting as said pips.

25. The gaming apparatus as defined in claim 13, wherein said playing dice each have at least one hologram thereon acting as said pips.

26. The gaming apparatus as defined in claim 13, wherein said playing dice each have an interference mirror covering said pips.

27. The gaming apparatus as defined in claim 13, wherein said playing dice each have reflectors at at least one of corners and edges thereof to facilitate detection.

* * * * *